United States Patent [19] [11] 4,365,995
Mori [45] Dec. 28, 1982

[54] METHOD OF PRODUCING MULTI-LAYER SLIDING MATERIAL
[75] Inventor: Sanae Mori, Nagoya, Japan
[73] Assignee: Daido Metal Company Ltd., Nagoya, Japan
[21] Appl. No.: 168,980
[22] Filed: Jul. 14, 1980
[51] Int. Cl.³ .............................................. B22F 3/00
[52] U.S. Cl. ........................................ 419/6; 72/364; 72/365; 72/366; 72/700; 419/8; 419/28
[58] Field of Search .............. 75/208 CS, 208 R, 214; 72/364, 365, 366, 700

[56] References Cited
U.S. PATENT DOCUMENTS
4,083,220  4/1978  Kobayashi et al. .................. 72/364
4,121,928  10/1978  Mori ................................ 75/208 CS
4,159,217  6/1979  Selines et al. ..................... 72/700

Primary Examiner—Brooks H. Hunt
Attorney, Agent, or Firm—Karl W. Flocks; Sheridan Neimark

[57] ABSTRACT

A steel strip having distributed thereon powder containing aluminum as its main ingredient is cooled to a temperature range of less than 15° C. below room temperature. The cooled material is immediately subjected to cold rolling and then to sintering, to produce multi-layer sliding material. By cooling the steel strip and the powder distributed thereon together to a temperature range of less than 15° C. below room temperature, occurrence of seizure between the powder and rolls of a rolling mill can be avoided.

8 Claims, 7 Drawing Figures

S

METHOD OF PRODUCING MULTI-LAYER SLIDING MATERIAL

BACKGROUND AND SUMMARY OF THE INVENTION

This invention relates to a method of producing multi-layer sliding material.

I have carried out research on multi-layer sliding material and a method of producing same and have developed inventions disclosed in U.S. Pat. No. 4,121,928, U.S. Pat. No. 4,189,522 and Japanese Patent Publication 2441/80. The methods of producing sliding material described in these inventions of prior patents can be summarized as follows. One method is a method of producing multi-layer sliding material in which powder material is supplied to a steel strip and rolled, and the rolled material is then sintered. Another method is a method of producing multi-layer sliding material in which the multi-layer material produced in the first-mentioned method is subjected to rolling and heat treatment, and these process steps can be followed as many times as required.

The powder material used in the aforesaid methods contain aluminum as its main ingredient, and at least one additive selected from the group of low melting point metal lubricants consisting of Pb, Sn, etc., and the group of solid lubricants consisting of metal sulfides, metal-oxides, metal fluorides, etc., the proportion of the additive being 2–40 weight percent. Also, the powder material of the aforesaid composition may, when necessary, be added with at least one aluminum strengthening element selected from the group consisting of Cu, Ni, Si, Mg, and Zn in a proportion of 0.1–15 weight percent in total.

In carrying out the aforesaid methods for producing multi-layer sliding material according to the inventions of prior applications into practice, it has been found that when the rolling step is followed, the surface of the sliding layer (that is, the surface of the alloy layer on the steel strip) of the material tends to develop seizure on the surface of the rolls of the rolling mill.

With an increase in the time required for production, friction between the rolls of the rolling mill and the multi-layer sliding material and heat produced in the material due to plastic deformation thereof cause the temperature of the rolls to rise, and this elevation in temperature is considered responsible for the seizure which makes continuation of production impossible.

The aforesaid rise in temperature in the rolling step has tended to cause the additive contained in the powder material, in particular the low melting point metallic lubricant, to expand in thin yarn form. It has been determined that multi-layer sliding material with a structure of this yarn-like additive distributed therein is low in wear resisting characteristics, and it has been found that laminar peeling tends to occur along the low melting point lubricant additive phase.

An object of this invention is to provide a method of producing multi-layer sliding material which obviates the aforesaid disadvantages of the inventions of the prior applications.

Another object is to provide a method of producing multi-layer sliding material which comprises the step of forced cooling of the powder material, immediately before being subjected to rolling, to a temperature range which is less than 15° C. below room temperature (ambient temperature) whereby seizing of the surface of the alloy layer of the multi-layer sliding material on the roll surface of the rolling mill can be avoided.

DESCRIPTION OF THE PREFERRED EMBODIMENTS

Figure 1:
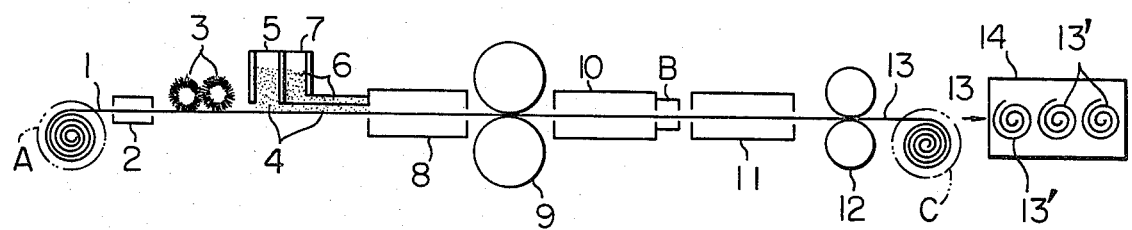
FIG. 1 is a schematic view in explanation of the method of producing multi-layer sliding material comprising one embodiment of the invention.

Preferred embodiments of the invention will now be described by referring to the drawings. Referring to FIG. 1, an uncoiler (supply source) A has wrapped round thereon a steel strip 1 which is usually formed of low carbon steel (JIS G3141 SPCE) and which may be plated with Ni, Cu, etc., on its surface. Upon being payed out of the uncoiler A, the steel strip 1 is led to pass through a degreasing tank 2 to be exposed to trichlorofluoroethylene gas to have its surfaces cleaned by the solvent. Then the steel strip 1 is led to a wire brush 3 which polishes the surface of the steel strip 1 on which bonding of powder material is to be applied.

Following the aforesaid pretreatment, the steel strip 1 receives a supply of powder 4 for a first layer which forms a boundary or a bonding layer (See Table 1) from a first dispenser 5. Then powder 6 for a second layer which is an alloy layer (See Table 1) is distributed onto the first layer from a second dispenser 7. The amount of the powder supplied to the steel strip may be suitably selected depending on the use to which the multi-layer sliding material produced as the end product is put. Preferably, the first layer of the multi-layer sliding material has a thickness in the range between 0.01 and 0.25 mm and the second layer thereof has a thickness in the range between 0.15 and 1.5 mm.

Thereafter the steel strip 1 having the powder of the first layer and the powder of the second layer distributed thereon is led to a cooling device 8 wherein a cooling step is followed which is indispensable to the method according to the invention. In the cooling device 8, the steel strip 1 having the first and second layers in powder deposited thereon is forcedly cooled to a temperature in the range of less than 15° C. below room temperature. There are variants to this forced cooling step subsequently to be described.

After having been forcedly cooled, the steel strip 1 having the first and second layers in powder state distributed thereon is passed between the gap of rolls of a rolling mill 9 where screw down is effected to bring the mean density of the layers of powder to over 90% of the theoretical density and bond the two layers to each other and to the steel strip 1.

At this time, the surface of the second layer (alloy layer) has a metallic color. The material obtained by rolling the two layers into bonding relation to the steel strip 1 is passed through a sintering furnace 10 to effect sintering at a temperature within the range between 280° and 520° C.

Sintering is usually carried out in the atmosphere. However, sintering may be carried out in inert gas atmosphere or reducing atmosphere. The optimum sintering temperature may vary depending on the composition of powder material and the period of time in which sintering is effected. Usually, the shorter the period of time for effecting sintering; the higher must be the sintering temperature. However, when the temperature exceeds 520° C., the steel strip 1 or the layer of plating applied to the steel strip 1 may react with the powder material to produce brittle intermetallic compounds. Following various trial-and-error experiments, it has been ascertained that if the essential heating time is set at a range between 30 and 40 minutes, then the temperature should be selected from the range between 470° and 500° C. When it is desired to further shorten the heating time or achieve sintering in a shorter period of time, other suitable heating means, such as high frequency heating means, may be used with advantage. The steps to be described hereafter are followed depending on the use to which the end product is put or when necessary.

Following the sintering step, the steel strip 1 having the first and second layers bonded thereto is passed through a cooling zone B, and then passed through a cooling device 11 when the material is not cooled sufficiently to a temperature range below room temperature in the cooling zone B. By the cooling device 11, the material is cooled to a temperature range which is less than 15° C. below room temperature.

The cooled material is passed between rolls of a second rolling mill 12, so as to finish the material and give same predetermined dimensions.

The tri-layer bearing material 13 produced as described hereinabove is taken up on a coiler C and passed through an annealing furnace 14 where it is annealed in the temperature range between 280° and 520° C. The optimum annealing temperature is a function of the composition of the powder material and the annealing time. Preferably, the annealing temperature and time are 370° to 440° C. and 4 to 7 hours, respectively.

The annealing furnace 14 may be replaced by a continuous annealing furnace or a continuous annealing furnace utilizing a gas atmosphere, not shown.

While the first embodiment has been described in detail hereinabove, it is to be understood that the invention is not limited to the specific details described herein, and that many changes and modifications may be made therein. Matters which require special attention when the process steps of the method described above are followed and the results achieved by the embodiment of the invention described above will now be described.

(1) It goes without saying that the compositions of the powder material used in the method according to the invention, or more specifically the compositions of the powder material used for the boundary layer and the alloy layer (first and second layers) and the ingredients thereof, are similar to those of the powder material used in the inventions of the prior patents.

(2) As described hereinabove, the steel strip 1 having an aluminum powder layer deposited thereon is forcedly cooled to a temperature range of less than 15° C. below room temperature by the cooling devices 8 and 11. The temperature of the steel strip 1, which may vary depending on the season and the degree to which the steel strip is machined, generally rises to 24°–40° C., sometimes to 60°–80° C., due to generation of heat by polishing effected with the wire brush 3. The higher the temperature of the steel strip 1, the earlier becomes the occurrence of seizing of the powder material in contact with the rolls of the rolling mill 9. Thus forced cooling is imperative in the method according to the invention.

Cooling may be effected in many ways. The cooling systems used may include cooling by a refrigerating apparatus, air jet system, a water jacket system relying on cooling by a chiller, cooling by contact with metal and cooling by using dry ice. It is to be noted that the ability of the cooling means required may vary depending on the temperature of the strip 1 prior to cooling and the speed of continuous feeding of the strip 1. In particular, when cooling is effected by the cooling device 8, care should be exercised so that no vibration will be imparted to the powder material on the strip 1 because enough compactness of the powder material has not yet been obtained. For practical purposes, the use of a refrigerating apparatus would be convenient in cooling the steel strip 1. Conversely, if the steel strip 1 is overcooled, the moisture content of the atmosphere might cause formation of dew on the steel strip 1 when the latter is passed through the cooling devices 8 and 11, thereby adversely affecting the powder layers. Thus it would be necessary to set a temperature to which the steel strip 1 is cooled by taking into consideration the atmospheric temperature and the difference between the atmospheric temperature and the temperature of the steel strip 1. In any case, it is not desirable that the temperature of the steel strip 1 be reduced to a temperature below room temperature by over 15° C.

(3) To accomplish the objects of the invention, it is advantageous to forcedly cool the rolls of the rolling mills 9 and 12, in addition to cooling the steel strip 1 as aforesaid. The rolls of the rolling mills may be cooled by means of a spot cooler, water cooling system, etc.

In the summertime, cooling of lubricating oil for the rolls of the rolling mills by means of a refrigerating apparatus has the effect of enabling uniform distribution of the lubricating oil to be obtained.

(4) It has been found that the conditions under which seizure occurs may vary from primary rolling (by means of primary rolling mill 9) to secondary rolling (by means of secondary rolling mill 12). More specifically, in primary rolling, roll lubricating oil is generally used. One of the problems encountered is the difficulty with which control of the amount of supplied lubricating oil is effected. If the supply of lubricating oil is too excessive, the oil would penetrate the powder material. Also, if it were too small, seizure would occur between the rolls and the powder to be worked. Thus it is essential to effect control of the supply of lubricant oil in such a manner that the amount is minimized so long as no seizure is caused. It should be borne in mind that if the powder material fed to the rolls were high in temperature, the lubricating oil would become low in viscosity, thereby causing seizure to occur.

Table 2 shows the relation between the temperature of the material prior to primary rolling and the degree of seizure that might occur. With room temperature in the range between 22° and 23° C., the temperature of the material prior to primary rolling is preferably between 18° and 22° C.

The temperature of the material that has passed between the rolls of primary rolling mill 9 may vary depending on the heat generated by friction, the rate of screw down and other factors. However, the material generally shows a rise in temperature of 3°–25° C. from the pre-rolling temperature level.

When lubricating oil is used in secondary rolling (by means of secondary rolling mills 12), the lubricating oil might penetrate porous portions of the material that has been subjected to primary sintering (in primary sintering furnace 10), and consequently secondary rolling might not have any effect. Therefore, lubricant oil is not usually used. Instead, solid lubricant, such as graphite powder, is used. In this case, seizure might occur if the material fed between the rolls were high in temperature.

Table 3 shows the relation between the temperature of the material prior to secondary rolling and the degree of seizure that might occur. With room temperature in the range between 19° and 20° C., the temperature of the material prior to secondary rolling is preferably between 8° and 20° C.

The temperature of the material that has just passed between the rolls of secondary rolling mill 12 may vary depending on the heat generated by friction, the rate of screw down and other factors. However, the material generally shows a rise in temperature of 11°–36° C. from the pre-rolling temperature level.

Figure 2:
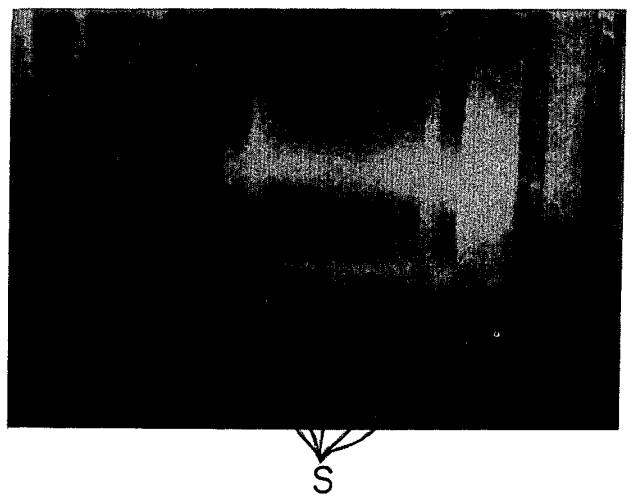
FIG. 2 is a photograph showing the appearance of the roll which has caused seizing when no forced cooling was carried out.
Figure 3:
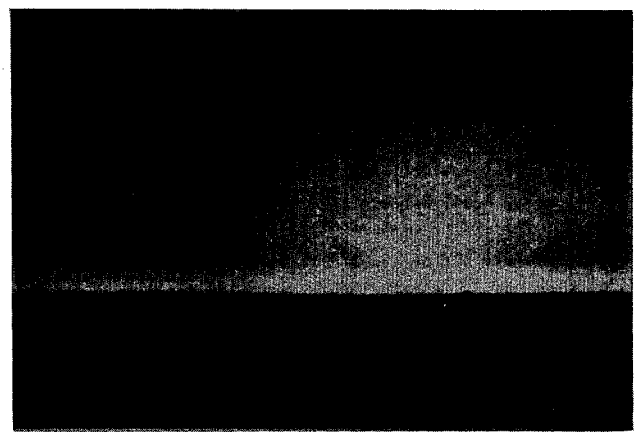
FIG. 3 is a photograph showing the appearance of material in which seizing has occurred.

(5) FIG. 2 shows a photograph of the material in which seizure has occurred between the material and the roll surface (the symbol S designates seizures) when the material was not forcedly cooled prior to the rolling step. FIG. 3 is a photograph of the surface of the material in which seizure has occurred, FIG. 4 is a typical optical micrograph (100×) of the multi-layer sliding material produced by the embodiment of the method in conformity with the invention (including the process steps shown in FIG. 1).

Figure 4:
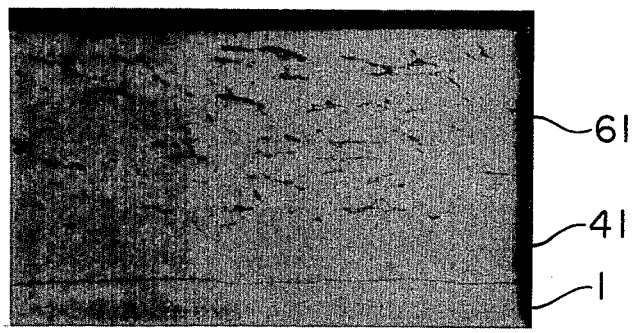
FIG. 4 is an optical micrograph (100×) of the multi-layer sliding material produced by the method according to the invention, shown in cross section by cutting the material parallel to the length thereof.

In FIG. 4, a steel strip 1 is formed thereon a boundary layer 41 and an alloy layer 61.

Figure 7:
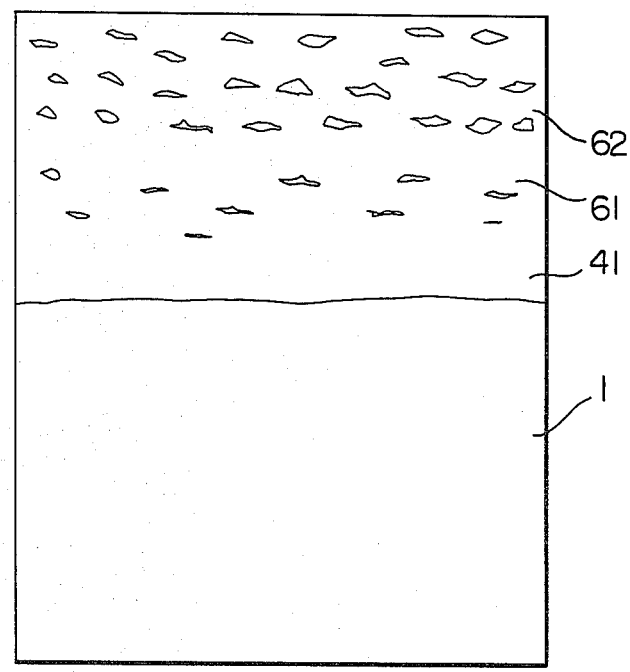
FIG. 7 is a schematic view of a model of the structure of the multi-layer sliding material produced by another embodiment of the method in conformity with the invention.

FIG. 7 is a model of the structure of multi-layer sliding material produced by the method according to the invention, which has two alloy layers 61 and 62. The compositions of the layers 41 and 61 shown in FIG. 4 are shown in Tables 1 and 4. The alloy layer 61 shown in FIG. 7 contains 10% Pb and the balance Al, and the alloy layer 62 shown therein contains 30% Pb and the balance Al. In FIGS. 4 and 7, it will be clearly seen that the phase of the low melting point metallic lubricant is not in fine yarn form but is in the form of multi-sided small grains.

Figure 5:
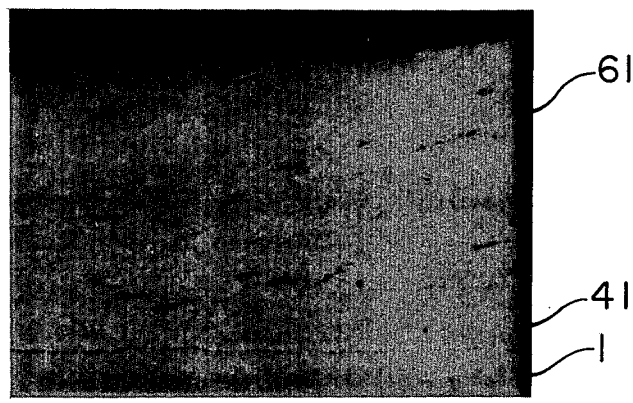
FIGS. 5 and 6 are optical micrographs (100×) of the multi-layer sliding material produced by the inventions of the prior applications, shown in cross section by cutting the material parallel to the length thereof.
Figure 6:
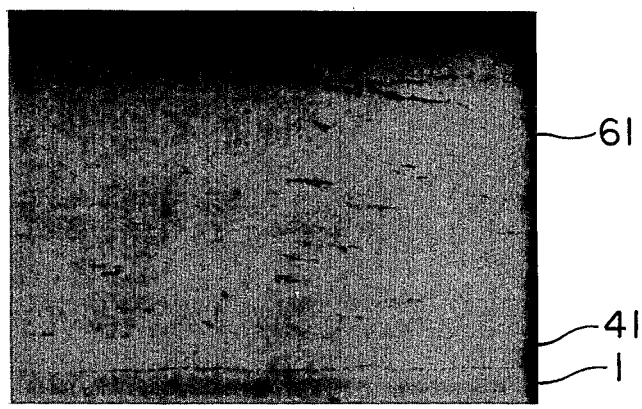

FIGS. 5 and 6 are typical optical micrographs (100×) of the multi-layer sliding material in which seizure has occurred between the material and the rolls of the rolling mills 9 and 12. It will be seen that the phase of the low melting point metallic lubricant is in the form of fine yarn and that there are irregularities on the surface of the alloy layer 61. The compositions of the layers of the multi-layer sliding material shown in FIGS. 3–6 are shown in Table 4.

From the foregoing, it will be appreciated that the provision by the present invention of the step of subjecting to forced cooling the steel strip 1 having powder layers distributed thereon to lower the temperature thereof by less than 15° C. below room temperature immediately before the rolling step of the method in addition to the method of the invention of a prior application can achieve results which are summarized as follows.

(1) In primary rolling (by means of rolling mill 9), occurrence of seizure between the material and rolls can be avoided, and the film of lubricating oil on the surface of each roll can be kept uniform.

(2) In secondary rolling (by means of rolling mill 12), occurrence of seizure between the material and rolls can be avoided, and in particular disintegration of end portions of the material is minimized.

(3) In optical micrographs, the structure of the multi-layer sliding material shows minimized elongation of the low melting point metal lubricant, such as Pb, Sn, etc., and the solid lubricant occurs in the form of grains of polygonal, irregular, multi-sided, sharp-pointed shape. Thus the bearing alloy of the material has improved fatigue strength.

(4) With improved fatigue strength, the amount of low melting point metallic lubricant contained in the powder material can be increased. This enables the multi-layer sliding material to have application as a sliding bearing for high speed rotation.

TABLE 1

| | Ingredients (Weight %) | | | | |
|---|---|---|---|---|---|
| | Pb | Sn | Cu | Si | Al | |
| Powder for First Layer (Boundary Layer) (4, 41) | — | — | 0.60 | 2.90 | Balance | Powder of ternary alloy Cu—Si—Al |
| Powder for Second Layer (Alloy Layer) (6, 61) | 13.02 | 0.98 | 0.56 | 2.70 | Balance | Powder mixture of Binary alloy Pb—Sn and ternary alloy Cu—Si—Al |

Note: Numerals in the parentheses indicate numerals used in the specification.

TABLE 2

| Experiment No. | Temp. of Material before Primary Rolling (°C.) | Results |
|---|---|---|
| 1 | 38–44 | No stability of lubricating oil film on roll surfaces. |
| 2 | 24–26 | Slight instability of lubricating oil film on roll surfaces. |
| 3 | 18–22 | Stable lubricant oil film on roll surfaces. |
| 4 | 6–7 | Dew formation on material, and crack formation on end portions. |

Note: Room temperature: 22–23° C.

TABLE 3

| Experiment No. | Temp. of Material before Secondary Rolling (°C.) | Results |
|---|---|---|
| 5 | 36–38 | Seizure occurred. |
| 6 | 28–30 | Long period. Seizure occurred at end portions. |
| 7 | 18–20 | Seizure minimized. |
| 8 | 12–13 | No seizure. |
| 9 | 8–11 | No seizure. Rolls were shiny. |
| 10 | 5–6 | No seizure. Dew formation |

TABLE 3-continued

| Experiment No. | Temp. of Material before Secondary Rolling (°C.) | Results |
|---|---|---|
| | | on the material. |

TABLE 4

| Figure | Reference Numeral 1 | 4 (41) | 6 (61) | Remarks |
|---|---|---|---|---|
| FIG. 3 | Steel JIS G3141 SPCE | See Table 1 | See Table 1 | Prior Appln. |
| FIG. 4 | Steel JIS G3141 SPCE | See Table 1 | See Table 1 | Present Invention |
| FIG. 5 | Steel JIS G3141 SPCE | See Table 1 | See Table 1 | Prior Appln. |
| FIG. 6 | Steel JIS G3141 SPCE | See Table 1 | See Table 1 | Prior Appln. |

I claim:

1. A method of producing multi-layer sliding material comprising the steps of:

cleaning and/or polishing the surfaces of a steel strip or a steel strip plated with nickel;

depositing on the surface of said steel strip treated in the first step powder of a first layer consisting of aluminum alone or containing aluminum as its main ingredient and at least one additive selected from the group consisting of aluminum strengthening elements, solid lubricants and low melting point metal lubricants, and distributing on said powder of said first layer powder of a second layer containing aluminum as its main ingredient and at least one additive selected from said group of lubricant additives;

when said steel strip having said powder of said first layer and said powder of said second layer deposited thereon is at a temperature greater than room temperature, cooling to a temperature range of room temperature to 15 C. degrees below room temperature, but not so low that moisture will condense in the form of dew on the powder covered strip;

passing said steel strip having said powder of said first layer and said powder of said second layer deposited thereon through a gap of rolling mill to effect cold rolling to provide a bond between said powder of said first layer and said powder of said second layer and between the powder and said steel strip so as to bring the density of the powder to a level above 90% of the theoretical density after pressure bonding is effected; and sintering the rolled composite material at a temperature in the range between 280° and 520° C.

2. A method of producing multi-layer sliding material comprising the steps of:

rendering clean and/or coarse the surfaces of a steel strip or a steel strip plated as with nickel;

depositing on the surface of said steel strip treated in said first step powder of a first layer consisting of aluminum or containing aluminum as its main ingredient and at least one additive selected from the group consisting of aluminum or containing aluminum as its main ingredient and at least one additive selected from the group consisting of aluminum strengthening elements, solid lubricants and low melting point metal lubricants, and distributing on said powder of said first layer powder of a second layer containing aluminum as its main ingredient and at least one additive selected from said group of lubricant additives and powder of a third layer containing aluminum as its main ingredient and at least one additive selected from said group of lubricant additives, the amount of the additives in said third layer being larger than in said second layer;

when the temperature of said steel strip having said powder of said first layer, said powder of said second layer and said powder of said third layer is greater than room temperature, cooling the powder coated strip to with a range of room temperature to 15 C. degrees lower than room temperature, but not so low that moisture will condense as dew on the cooled, powder coated strip;

passing said steel strip having said powder of said first layer, said powder of said layer and said powder of said third layer deposited thereon through a rolling mill to effect cold rolling to provide a bond between said powder of said first layer said powder of said second layer and said powder of said third layer and between the powder and said steel strip so as to bring the density of the powder to a level above 90% of the theoretical density after pressure bonding is effected; and sintering the solid, composite material at a temperature in the range between 280° and 520° C.

3. A method as claimed in claim 1 or 2, further comprising the steps of cooling said hot, sintered, composite material to a temperature range of from room temperature to a temperature not more than 15 C. degrees less than room temperature, subjecting said cooled material to cold rolling to impart satisfactory compactness and predetermined dimensions to said material, and subjecting said material to heat treatment at a temperature in the range between 280° and 520° C.

4. A method as claimed in claim 1 or 2, further comprising the step of effecting forced cooling to said rolls of said rolling mill.

5. A method as claimed in claim 4, wherein lubricating oil applied to said rolls of said rolling mill is cooled by means of a refrigerating apparatus.

6. A method as claimed in claim 1 or 2, wherein room temperature is approximately 19°–23° C.; and wherein the temperature of said powder covered steel strip prior to cooling thereof is 24°–80° C.

7. A method as claimed in claim 1 or 2, wherein a lubricant oil film is applied to said powder covered steel strip and said powder covered steel strip is cooled to a temperature in range of 18°–22° C.

8. A method as claimed in claim 1 or 2, wherein said powder covered strip is cooled to a temperature in the range of 8°–13° C.

* * * * *